United States Patent [19]

Weddeling

[11] Patent Number: 4,825,760
[45] Date of Patent: May 2, 1989

[54] FEED DEVICE FOR PISTON TYPE BAILER

[75] Inventor: Otger Weddeling, Harsewinkel, Fed. Rep. of Germany

[73] Assignee: Claas OHG, Harsewinkel, Fed. Rep. of Germany

[21] Appl. No.: 120,415

[22] Filed: Nov. 13, 1987

[30] Foreign Application Priority Data

Nov. 13, 1986 [DE] Fed. Rep. of Germany ....... 3638792

[51] Int. Cl.$^4$ ......................... B30B 1/26; A01D 39/00
[52] U.S. Cl. ................................ 100/188 R; 100/189;
100/216; 56/344
[58] Field of Search ................... 100/216, 215, 188 R, 100/189; 56/344, 341

[56] References Cited

U.S. PATENT DOCUMENTS

| | | | |
|---|---|---|---|
| 3,552,109 | 1/1971 | Murray et al. | 100/215 X |
| 4,514,968 | 5/1985 | Underhill | 100/188 R X |
| 4,525,991 | 7/1985 | Naaktgeboren | 100/189 X |
| 4,569,282 | 2/1986 | Galant | 100/189 |
| 4,656,938 | 4/1987 | Webb et al. | 56/341 X |

Primary Examiner—Andrew M. Falik
Attorney, Agent, or Firm—Michael J. Striker

[57] ABSTRACT

A piston type bailer for producing bales of agricultural material comprising a bailing chamber with a reciprocating pressing piston, a crank drive for reciprocating the pressing piston. A feeding element is arranged to feed agricultural material to the bailing chamber. As auxiliary drive changes a position of the feeding element from the crank drive. The auxiliary drive having a first crank unit associated with the feeding element and including a first crank pin rotatably supporting the feeding element, a crank axle and a first crank arm arranged on the crank axle, and a second crank unit associated with the crank drive of the pressing piston and includes a second crank arm driven from the pivot axle of the crank drive and a pivot pin driven by the crank arm. The auxiliary drive also has a turning lever also arranged on and rotatable on the crank axle of the first crank unit and having an end which is spaced from the crank axle and provided with a rod connected with the opposite end of the feeding element to form support of the feeding element at the opposite end, and a link which is connected with the turning lever through a further intermediate link member and supported on the second crank pin which is driven through the second crank arm of the second crank unit from pivot axle of the crank drive of the pressing piston.

4 Claims, 2 Drawing Sheets

FEED DEVICE FOR PISTON TYPE BAILER

BACKGROUND OF THE INVENTION

The present invention relates to a piston type bailer for producing bales of agricultural material.

More particularly, it relates to such a piston type bailer which has a bailing chamber, a pressing piston which reciprocates in the bailing chamber under the action of a crank drive, a supply channel which opens into the pressing channel, and a material feeding element which is associated with the supply channel and is also movable by a crank drive. The movement path of the element is changeable by means of an auxiliary drive which extends from the crank drive of the pressing piston. The feeding element is rotatably supported on a crank pin and is connected with its end opposite to its tips, with an end of a link rod whose other ends are mounted on a position-changeable support.

Piston type bailer of the above-mentioned general type are known in the art. One of such piston type bailer is disclosed, for example, in the European Patent No. 0120780. In the piston type bailer disclosed in this reference, two portions of agricultural material are supplied one after the other by the feeding element to the inlet opening of the bailing chamber closed by the pressing piston. During the third transporting stroke of the feeding element, a third portion is supplied and together with both portions located in front of the filling opening, displaced into the bailing chamber after release of the filling opening. In this manner the whole free chamber produced during the return stroke of the pressing piston is completely filled. The disadvantage of such a bailer is that the auxiliary drive required for changing the movement path of the feeding element is composed of a wheel transmission which is periodically turnable on an axle. First of all, the manufacture of such wheel transmission is very expensive, since for insuring its correct operation even in difficult conditions in the agricultural environment, care always must be taken to prevent deposition of particles in the wheels. On the other hand, damages which take place over certain time and cannot be excluded require the exchange of the whole wheel transmission.

SUMMARY OF THE INVENTION

Accordingly, it is an object of the present invention to provide an auxiliary drive which is designed so that it does not have any toothed or chain wheels but includes a plurality of inexpensive and easy to mount levers and rods.

In keeping with these objects and with others which will become apparent hereinafter, one feature of the present invention resides, briefly stated, in a piston press which has a turning lever which is freely rotatable on an axle of a crank unit of a pick-up element and has an end which is spaced from the axle and a connection to a position-changeable support of the pick-up element, and a link which is connected with the turning lever and supported on a crank pin which is driven via a crank arm from a turning axle of a crank drive for the pressing piston.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
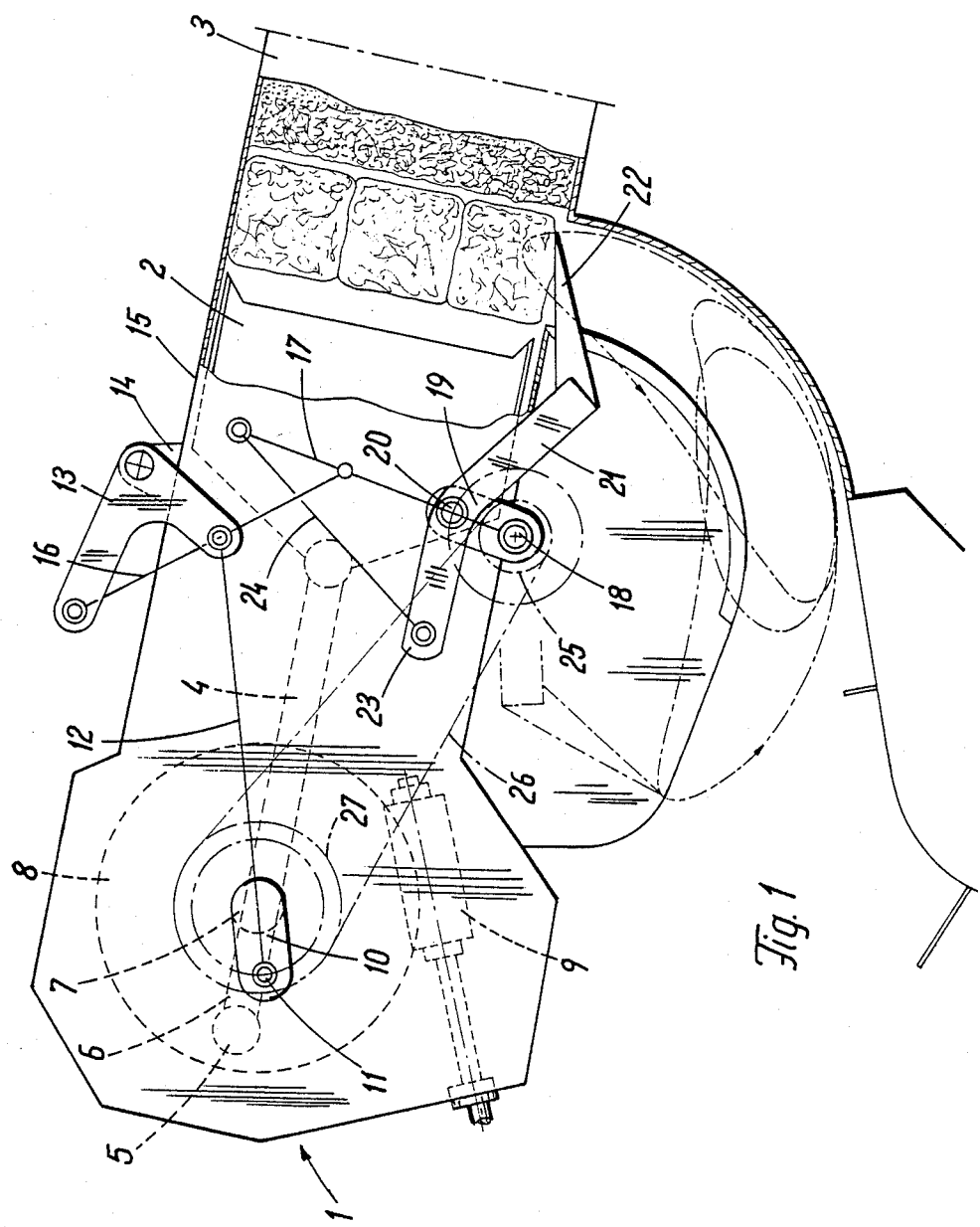
FIG. 1 is a partial side view of a piston type bailer for producing bales in accordance with the present invention.
Figure 2:
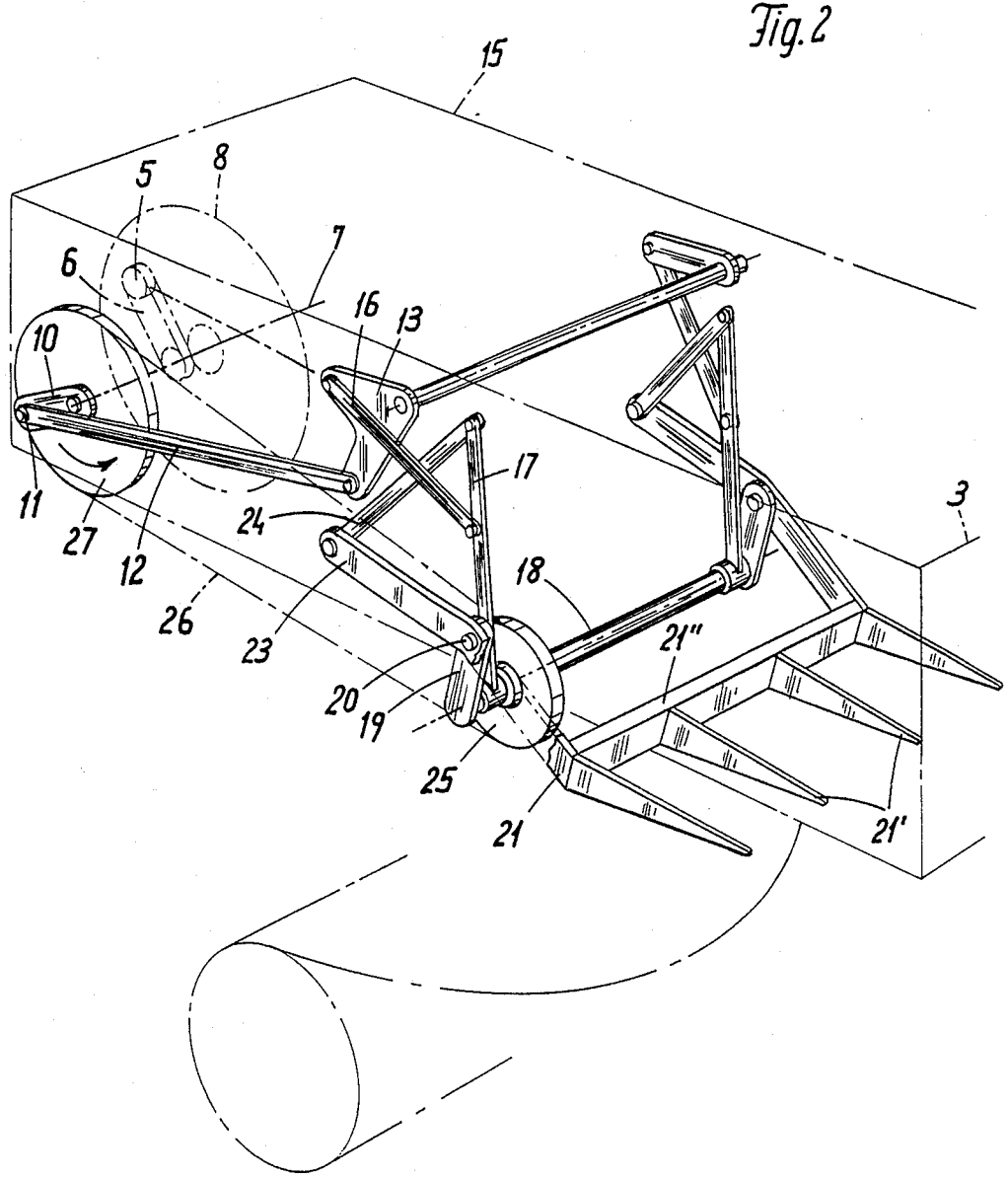
FIG. 2 is a perspective view of a drive for a feeding element of the type bailer of the present invention.

A piston type bailer is identified as a whole with reference numeral 1. Its piston 2 reciprocates in a bailing chamber 3 via a piston rod 4. For this purpose the piston rod 4 engages at its one end with a crank pin 5, and a crank arm 6 of the crank pin 5 is mounted on an axle 7 so as to form a crank drive for reciprocating the pressing piston.

The axle 7 is continuously driven by a worm wheel 8 and a worm member 9 which engages with the latter. The axle 7 carries, in addition to the crank arm 6, also a further crank arm 10 whose crank pin 11 carries a link 12 so as to form one crank unit of an auxiliary drive. The link 12 at its end facing away from the crank pin 11 is connected with an angular lever 13. The angular lever 13 is rotatably supported in a console 14 which is fixedly connected with a housing of the piston type bailer 1.

At the end of the angular lever 13 which is remote from a supporting point or the link 12, a further link 16 engages with the angular link 13 and pivotally connects the latter with a turning lever 17. The turning lever 17 is freely rotatably mounted on an axle 18. A crank arm 19 arranged on this axle 18 carries pins 20 which rotatably support outer extended feeding elements 21 so as to form another crank unit of an auxiliary drive. The outer feeding elements 21 are connected with inner feeding prongs 21' by means of a traverse 21'' so as to form a feeding unit. At least one of the outer extended feeding elements 21 is provided at its end 23 which faces away of the tips 22 with a rod 24 which forms a connection to the turning lever 17.

The drive of the crank arm 19 is performed via a chain wheel 25 which is connected with its, a chain 26, and a chain wheel 27 which is fixedly seated on the axle 7. The ratio between the chain wheel 25 and the chain wheel 27 is selected so that the chain wheel 25 during one revolution of the chain wheel 27 makes three revolutions. Because of this transmission ratio and because of the arrangement of the lever transmission 12, 13, 16, 17, 24, the feeding element 21 during one piston stroke of the pressing piston 2 performs 3 feeding strokes and the feeding tips move over the movement paths which are identified with dash-dot lines.

The conditions which occur with respect to the filling of the bailing chamber 3 with agricultural material through the filling opening are not described here since they are clearly described in the above-identified European patent No. 0120780. It should be mentioned that the above described link transmission can also be arranged on both sides of the bailer for uniform and improved force transmission.

It will be understood that each of the elements described above, or two or more together, may also find a useful application in other types of constructions differing from the types described above.

While the invention has been illustrated and described as embodied in a piston press for producing bales of agricultural material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A piston type bailer for producing bales of agricultural material, comprising a bailing chamber provided with a reciprocating pressing piston; a crank drive arranged to reciprocate said pressing piston and having a pivot axle; a feeding element arranged to feed agricultural material to said bailing chamber, said feeding element being position-changeable and having a working end and an opposite end; and an auxiliary drive arranged to change a position of said feeding element from said crank drive of said pressing piston, said auxiliary drive having a first crank unit which is associated with said feeding element and includes a first crank pin rotatably supporting said feeding element, a crank axle and a first crank arm arranged on said crank axle; a second crank unit which is associated with said crank drive of said pressing piston and includes a second crank arm driven from said pivot axle of said crank drive and also includes a pivot pin driven by said crank arm; said turning lever which is also arranged on and rotatable on said crank axle of said first crank unit and has an end which is spaced from said crank axle and provided with a rod connected with said opposite end of said feeding element to form a support of said feeding element at said opposite end, and a link which is connected with said turning lever through a further intermediate link member and support on said pivot pin which is driven through said second crank arm of said second crank unit from said pivot axle of said crank drive of said pressing piston.

2. A piston press as defined in claim 1, wherein said auxiliary drive further has an angular lever which is freely rotatable and has one end connected with said link and another end provided with said rod which engages said turning lever.

3. A piston type bailer for producing bales of agricultural material, comprising a bailing chamber provided with a reciprocating pressing piston; a crank drive arranged to reciprocate said pressing piston and having a pivot axle; a feeding element arranged to feed agricultural material to said bailing chamber, said feeding element being position-changeable and having a working end and an opposite end; and an auxiliary drive arranged to change a position of said feeding element from said crank drive of said pressing piston, said auxiliary drive having a first crank unit which is associated with said feeding element and includes a first crank pin rotatably supporting said feeding element and also includes a crank axle; a second crank unit which is associated with said crank drive of said pressing piston and includes a crank arm driven from said pivot axle of said crank drive and also includes a pivot pin driven by said crank arm; said first crank unit further including a turning lever which is freely rotatable on said crank axle, said turning lever having an end which is spaced from said crank axle and forms a position-changeable support of said feeding element at said opposite end, and a link which is connected with said turning lever and supported on said second crank pin which is driven through said crank arm of said second crank unit from said crank drive of said pressing piston, said crank drive of said pressing piston and said auxiliary drive of said feeding element being formed so as to provide a ratio of 1:3 therebetween so that per one stroke of said pressing piston, said feeding element performs three strokes.

4. A piston type bailer for producing bales of agricultural material, comprising a bailing chamber provided with a reciprocating pressing piston; a crank drive arranged to reciprocate said pressing piston and having a pivot axle; a feeding element arranged to feed agricultural material to said bailing chamber, said feeding element being position-changeable and having a working end and an opposite end; and an auxiliary drive arranged to change a position of said feeding element from said crank drive of said pressing piston, said auxiliary drive having a first crank unit which is associated with said feeding element and includes a first crank pin rotatably supporting said feeding element and also includes a crank axle; a second crank unit which is associated with said crank drive of said pressing piston and includes a crank arm driven from said pivot axle of said crank drive and also includes a pivot pin driven by said crank arm; said first crank unit further including a turning lever which is freely rotatable on said crank axle, said turning lever having an end which is spaced from said crank axle and forms a position-changeable support of said feeding element at said opposite end, and a link which is connected with said turning lever and supported on said second crank pin which is driven through said crank arm of said second crank unit from said crank drive of said pressing piston; and further comprising means for driving said pivot axle of said crank drive of said pressing piston, said driving means including a worm wheel connected with said pivot axle and a worm member engaging with said worm wheel.

* * * * *